(No Model.)
P. B. DELANY.
TELEGRAPHY.
No. 510,007. Patented Dec. 5, 1893.
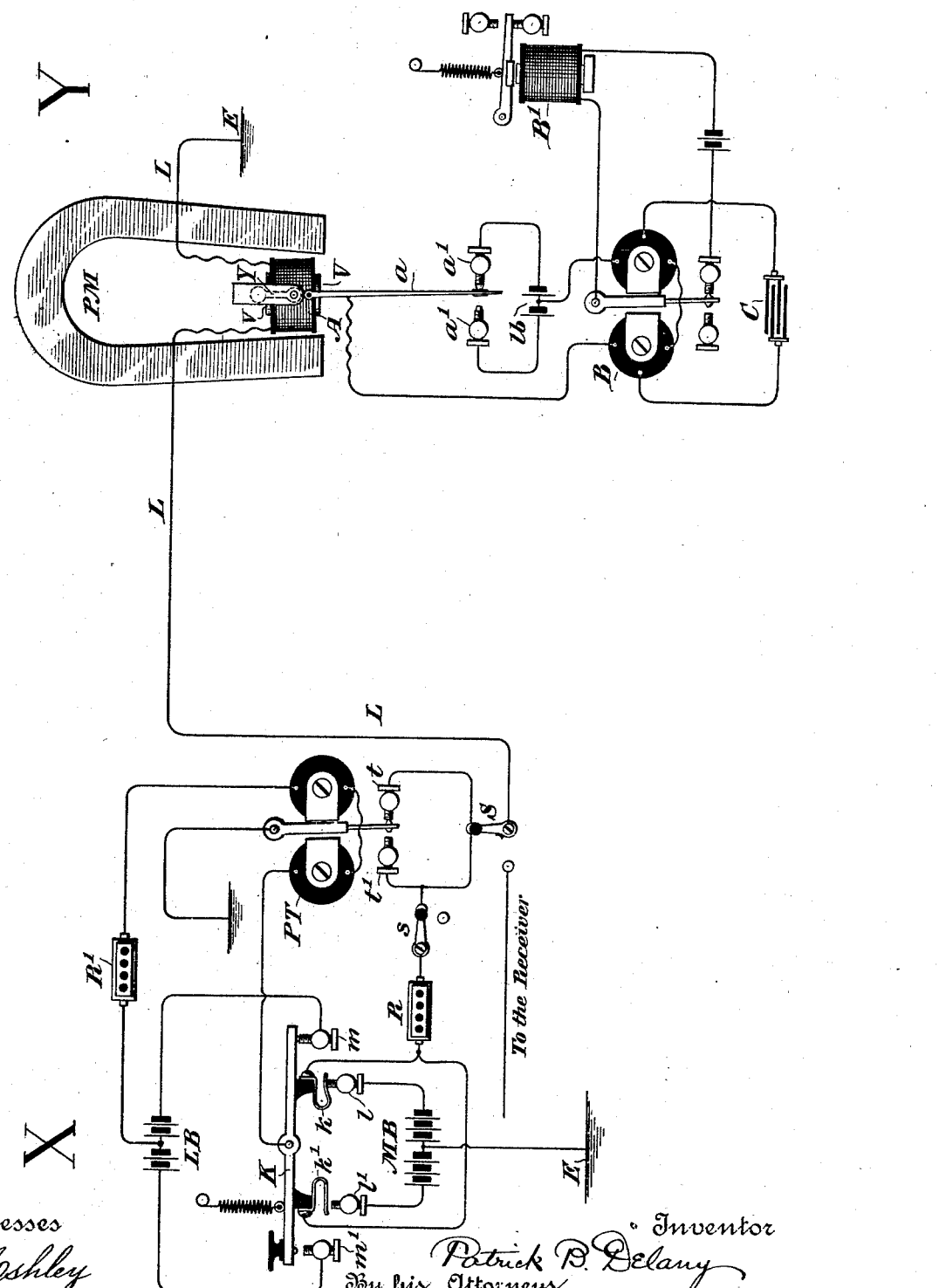
Witnesses
C. E. Ashley
H. W. Lloyd.
Inventor
Patrick B. Delany
By his Attorneys
Baldwin, Davidson & Wight

UNITED STATES PATENT OFFICE.

PATRICK B. DELANY, OF SOUTH ORANGE, NEW JERSEY.

TELEGRAPHY.

SPECIFICATION forming part of Letters Patent No. 510,007, dated December 5, 1893.

Application filed January 22, 1892. Renewed September 25, 1893. Serial No. 486,484. (No model.)

*To all whom it may concern:*

Be it known that I, PATRICK B. DELANY, a citizen of the United States, residing at South Orange, in the county of Essex and State of New Jersey, have invented certain new and useful Improvements in Telegraphy, of which the following is a specification.

My invention relates more especially to a system for the trasmission and reception of messages or signals over long and difficult circuits more particularly over underground and submarine cables of such length and capacity as to require very sensitive apparatus.

The primary object of my invention is to render the transmitted signals manifest at the receiving station by local devices that are controlled or thrown into action by the movement of the receiver proper in the main line. The receiver may be a very delicate apparatus that will readily respond to weak, depleted or attenuated currents received over the line. The movable part of such a receiver is to control a local circuit or circuits in which the more vigorously acting device or devices for rendering the signals manifest, are located. These devices may be, in general character, of any well-known type—that is to say, the received signals may be indicated by sounds or recorded in any suitable manner.

In carrying out my invention I employ a swinging suspended or pivoted coil included in the line, or a branch thereof, and located in a permanent magnetic field of suitable strength. The apparatus resembles somewhat the corresponding parts found in an ordinary Thomson cable recorder. In my system, however, the swinging coil which carries or actuates a suitable contact maker that controls the local circuit or circuits is entirely without bias and tends to remain at rest in any position to which it may be brought by the action of the current, that is to say, its inertia is the same for all positions and it has no tendency to return to any particular position. In this respect it is different from those ordinary cable receivers or recorders that are biased by springs, weights, bifilar filaments, magnetic attraction or other means, so that they always tend to return to a normal or zero position. A coil such as I purpose using may be pivoted or may be suspended, but I prefer to have it pivoted, because by the proper leveling and balancing of the parts it may be absolutely unbiased, whereas a suspended coil, though practically entirely unbiased for the purpose of this invention, might nevertheless have an infinitely small tendency to return to a given or zero position. Such an unbiased receiving coil constitutes a distinct feature of my invention. Secondarily, I purpose using with such an unbiased receiving coil a system or means of transmission in which the pulsations of current sent into the line at the sending end shall be of alternating polarity, or direction, and preferably as nearly as possible of uniform duration. Further I prefer that the line shall be put to ground and so remain during the intervals between the transmitted impulses, that is to say, when the line is not connected with the source or sources of energy from which impulses of current pass into the line, it shall be connected to earth, or the return conductor in the event that a metallic circuit is being worked.

Further my invention contemplates that the relay or receiving apparatus whose local circuit is made and broken by the contact carried or actuated by the swinging coil, shall be wound with a high resistance to the end that the very light contacts effected by the delicate contact maker may effect a proper and sufficient actuation of such apparatus. I prefer that the local apparatus of high resistance, whose circuit is thus controlled, shall be a polarized relay so that the swinging contact maker at one limit of its movement shall close the local circuit through the coil of the polarized apparatus in one direction and when it is at the opposite limit of its movement the local circuit shall be closed through the coil of the polarized apparatus in the opposite direction, or that the currents passed through the coil of the polarized apparatus shall be alternately of opposite polarity, as is well understood. I prefer that the polarized apparatus whose circuit is controlled through the medium of the swinging coil shall be a relay, and that it shall in turn control a local circuit containing a sounder or recorder. If it is desired that the received message shall be read by sound and that a record shall also be preserved, the apparatus in the circuit of the polarized relay may be a combined sounder and recorder, or simply a recorder, as is well understood.

The accompanying drawing is a diagram illustrating my invention.

X represents the transmitting station and Y the receiving station.

L is the main line.

The organization of the receiving devices is as follows: P M is a permanent horse-shoe magnet. In its field and between its poles is a delicately pivoted swinging coil A through which the line passes to earth. V represents the ordinary stationary core usually provided for such coils. The coil is entirely unbiased and when properly balanced will tend to remain at rest in any position in which it may be placed. It carries a light contact arm $a$ of aluminium or other material that plays between two contact stops $a'$, $a'$. Opposite poles of a local split battery $l\,b$ are respectively connected with these stops, and the contact arm $a$ is connected with the middle of said battery through the coil or coils of a polarized relay B. The armature of this relay is shown as controlling the local circuit of an ordinary neutral sounder B'. The contact between $a$ and $a'$, $a'$ respectively may be protected from sparking by a shunt containing a condenser or in other ways well known. When an impulse of current of one polarity or direction traverses the coil it turns to the right, and $a$ comes in contact with one of the stops $a'$, thus closing the polarized relay circuit through one pole of its battery, and where a current of opposite polarity or direction passes through the coil it swings to to the left and $a$ makes contact with the other stop $a'$. The polarized relay or apparatus B may act as a receiver, but I prefer to have it serve as a relay for a recorder or sounder B'.

The coil A is constructed and mounted so as to respond to very light currents, and since it is entirely unbiased, the only work performed by the current is the movement in one direction or the other according to the polarity of the current. As the contacts between $a$ and $a'$, $a'$ will be very light I use a suitable local battery $l\,b$ and a polarized relay wound with a high resistance so that it readily responds to relatively imperfect or light contacts at $a$, $a'$, $a'$, and I protect the contacts against sparks or welding action in any ordinary and suitable manner as above suggested. In the drawing I have shown a condenser C D in a shunt around the coils of the relay B.

By using currents of equal duration and opposite polarity and grounding the line between impulses I reduce to a minimum the evil effects of statical disturbances and tailing of currents. Any suitable transmitter may be employed. I prefer that shown. It is described and claimed in detail in my application, Serial No. 400,740, filed July 25, 1891, and is constructed and operated as follows: The line is connected to both stops of the armature of the polarized transmitter P T and the armature is permanently connected to earth. These stops are connected preferably through a resistance R with two insulated yielding contacts $k, k'$ on each side of the pivot of the transmitting key K. The main battery M B is grounded in the middle at E and practically forms therefore two sources of current and its two central or earth connected poles are therefore connected through the earth with the transmitter armature. Its opposite poles are respectively connected with the stops $l\,l'$ against which the contacts $k\,k'$ on the key work as the key is manipulated. The local battery L B that operates the polarized transmitter has its middle connected with one terminal of the coils of that transmitter. The opposite terminal of said coils is connected with the key K, and the opposite poles of the local battery are respectively connected with the front and back stops $m\,m'$ of the key. The parts are so constructed and related that when the key is depressed the insulated contact $k'$ thereon, and the contact $l'$ connected with one pole of the main battery are first closed before the key strikes its front stop $m'$. In like manner when the key is raised contact is made between $k$ and $l$ before the key comes against its back stop $m$. The effect of this organization is as follows: the apparatus being in condition for transmission and the key being up as indicated in the drawing, the armature of the transmitter P T is against its stop $t$, the local circuit being closed on the back stop $m$ of the transmitting key. One pole of the main battery is connected through the contacts $l\,k$ and resistance R with the main line, and is also grounded through the armature of the transmitter, the currents from the battery being therefore shunted from the main line. When the key is depressed the local of the polarized transmitter is first opened; the connection with the main battery is then broken at $k\,l$; the opposite pole of the battery is connected with the line and earth through the contact $k'\,l'$ and finally the other pole of the local battery of the polarized transmitter is completed at the contact $m'$ and the armature of the transmitter is thrown to its stop $t'$. When the armature of the transmitter is against either of its contacts the main battery is shunted from the line, but during the flight of the armature from one contact to the other the shunt is broken and the current from the battery M B passes to the line. It will also be perceived that the main line circuit is never open but is always completed either through the armature of the polarized transmitter, or through the main battery M B. The resistance R may be adjusted to suit the conditions and requirements of the circuit or may be dispensed with altogether. It is inserted for the purpose of preventing an undue depletion of the battery when it is shunted from the main line.

The length of time occupied by the armature of the transmitter in passing from one stop to the other after the closing of the circuit of the local battery, and consequently the duration of the impulses sent into the line, may be increased or diminished by the proper manipulation and adjustment of the local battery L B and the pole pieces of the polarized transmitter or of the limiting contacts $t\,t'$, all as is well understood, and to this end also a resistance R' may be placed in the local circuit.

I claim as my invention—

1. The combination with a main line and transmitting devices at one end thereof for sending currents of alternating polarity into the line, of a receiving apparatus at the other end of the line having an unbiased movable part that responds to said currents, a local circuit controlled thereby, and an instrument in said local circuit adapted to be worked by reverse currents traversing the same.

2. The combination, with a line and transmitting devices at one end thereof for sending currents of equal duration and alternating polarity into the line and grounding the line between said currents, of a receiving apparatus having an unbiased movable part that responds to the alternating currents received over the line and a local circuit controlled thereby.

3. The combination with a line and transmitting devices at one end thereof for sending currents of equal duration and alternating polarity into the line and grounding the line between said currents, of a receiving apparatus consisting of a magnet, an unbiased swinging coil located in the field of the magnet and included in the line, a contact maker carried or actuated by said coil its contact stops, the local circuit controlled thereby and the polarized instrument in said circuit.

4. A cable receiving apparatus consisting of the combination of the magnet, the swinging unbiased main line coil located in the field thereof, the contact maker carried or actuated by the coil, its contact stops, the local circuit, and a polarized instrument of relatively high resistance included in the local circuit, substantially as set forth.

5. A cable receiving apparatus consisting of the combination of the receiver-magnet the swinging main line, a coil located in the field thereof, the contact maker carried or actuated by the coil, its contact stops, a local circuit controlled by the movement of said coil, a polarized relay of relatively high resistance included in said local circuit, a second local circuit controlled by said polarized relay, and a repeater sounder, recorder or final receiver included in said local circuit.

6. The combination with a line, and transmitting devices at one end thereof for sending currents of opposite polarity and practically equal duration into the line and grounding the line between said currents, of a receiver consisting of a magnet, a movable coil in the field of said magnet and surrounding an iron core, said coil being included in the line, a contact maker carried or actuated by said coil, its limiting contact stops, the local circuit controlled thereby, and a polarized instrument in said circuit.

In testimony whereof I have hereunto subscribed my name.

PATRICK B. DELANY.

Witnesses:
FRANK S. OBER,
EDWARD C. DAVIDSON.